United States Patent [19]
McDaniel et al.

[11] Patent Number: 5,968,566
[45] Date of Patent: Oct. 19, 1999

[54] REFRIGERATED YEAST-RAISED PIZZA DOUGH

[75] Inventors: Deborah McDaniel, Ceresco, Mich.; David J. Aulik, Camarillo, Calif.

[73] Assignee: MLP Operating Company, Plano, Tex.

[21] Appl. No.: 08/856,058

[22] Filed: May 14, 1997

Related U.S. Application Data

[60] Provisional application No. 60/017,809, May 14, 1996.

[51] Int. Cl.$^6$ ....................................................... A21D 2/16
[52] U.S. Cl. .............................. 426/19; 426/20; 426/61; 426/62; 426/94; 426/128; 426/275; 426/549
[58] Field of Search ................................. 426/94, 19, 20, 426/61, 62, 275, 128, 549

[56] References Cited

U.S. PATENT DOCUMENTS

| | | |
|---|---|---|
| Re. 33,885 | 4/1992 | Mattson . |
| Re. 33,996 | 7/1992 | Jandacek . |
| Re. 34,617 | 5/1994 | Jandacek et al. . |
| 2,893,990 | 7/1959 | Hass et al. . |
| 3,429,714 | 2/1969 | Nelson . |
| 3,453,116 | 7/1969 | Freund . |
| 3,480,616 | 11/1969 | Osipow et al. . |
| 3,816,318 | 6/1974 | Hentschel . |
| 3,867,301 | 2/1975 | Watanabe et al. . |
| 3,872,020 | 3/1975 | Yamagishi et al. . |
| 3,928,212 | 12/1975 | Goto et al. . |
| 3,954,976 | 5/1976 | Mattson et al. . |
| 3,991,186 | 11/1976 | Murai et al. . |
| 3,996,206 | 12/1976 | Parker et al. . |
| 4,087,371 | 5/1978 | Lowicki et al. . |
| 4,124,543 | 11/1978 | Azuma et al. . |
| 4,137,338 | 1/1979 | Gawrilow . |
| 4,241,054 | 12/1980 | Volpenhein et al. . |
| 4,259,202 | 3/1981 | Tanaka et al. . |
| 4,268,498 | 5/1981 | Gedeon et al. . |
| 4,277,512 | 7/1981 | Inamine et al. . |
| 4,298,730 | 11/1981 | Galleymore et al. . |
| 4,306,062 | 12/1981 | Jones . |
| 4,363,763 | 12/1982 | Peterson . |
| 4,374,863 | 2/1983 | Savage . |
| 4,377,685 | 3/1983 | Bouniot et al. . |
| 4,379,755 | 4/1983 | Yamada et al. . |
| 4,380,555 | 4/1983 | Campagne et al. . |
| 4,395,365 | 7/1983 | Hasegawa et al. . |
| 4,461,782 | 7/1984 | Robbins et al. . |
| 4,496,547 | 1/1985 | Kawashima et al. . |
| 4,517,360 | 5/1985 | Volpenhein . |
| 4,518,772 | 5/1985 | Volpenhein . |
| 4,571,306 | 2/1986 | Kozak . |
| 4,609,560 | 9/1986 | Yuda et al. . |
| 4,664,932 | 5/1987 | Yamaguchi et al. . |
| 4,686,205 | 8/1987 | Betz et al. . |
| 4,789,664 | 12/1988 | Seligson et al. . |
| 4,806,632 | 2/1989 | McCoy et al. . |
| 4,822,875 | 4/1989 | McCoy et al. . |
| 4,826,699 | 5/1989 | Soe . |
| 4,834,895 | 5/1989 | Cook et al. . |
| 4,835,001 | 5/1989 | Mijac et al. . |
| 4,839,178 | 6/1989 | Seneau . |
| 4,847,108 | 7/1989 | Inoue et al. . |
| 4,857,358 | 8/1989 | Okumura . |
| 4,865,848 | 9/1989 | Cheng et al. . |
| 4,865,869 | 9/1989 | Tenney et al. . |
| 4,877,871 | 10/1989 | Klemann et al. . |
| 4,921,633 | 5/1990 | Funada et al. . |
| 4,927,920 | 5/1990 | Wagner et al. . |
| 4,940,586 | 7/1990 | Cheng et al. . |
| 4,942,054 | 7/1990 | Winter et al. . |
| 4,950,743 | 8/1990 | McCurry, Jr. et al. . |
| 4,952,687 | 8/1990 | Bodor et al. . |
| 4,962,092 | 10/1990 | Wood, Jr. . |
| 4,983,731 | 1/1991 | Wagner et al. . |
| 5,006,648 | 4/1991 | Van der Plank et al. . |
| 5,017,398 | 5/1991 | Jandacek et al. . |
| 5,039,544 | 8/1991 | Lansbergen et al. . |
| 5,064,678 | 11/1991 | Klemann et al. . |
| 5,071,975 | 12/1991 | Ver der Plank et al. . |
| 5,080,911 | 1/1992 | Saitou et al. . |
| 5,130,151 | 7/1992 | Averbach . |
| 5,154,855 | 10/1992 | Sekiguchi et al. . |
| 5,158,796 | 10/1992 | Bernhardt et al. . |
| 5,167,975 | 12/1992 | Tsurumaki et al. . |
| 5,171,590 | 12/1992 | Sluimer . |
| 5,180,603 | 1/1993 | Moriya et al. . |
| 5,194,281 | 3/1993 | Johnston et al. . |
| 5,196,215 | 3/1993 | Yokoyama et al. . |
| 5,208,060 | 5/1993 | Gautchier et al. . |
| 5,254,351 | 10/1993 | de Boer et al. . |
| 5,262,182 | 11/1993 | Kasahara et al. . |
| 5,314,707 | 5/1994 | Kester et al. . |
| 5,362,510 | 11/1994 | Mizoguchi et al. ............ 426/549 |
| 5,405,626 | 4/1995 | Van Der Graaf et al. . |
| 5,424,420 | 6/1995 | Hasenhuettl et al. . |
| 5,439,697 | 8/1995 | Gonzalez-Sanz . |

(List continued on next page.)

FOREIGN PATENT DOCUMENTS

686 477 A5  4/1996  Switzerland .

OTHER PUBLICATIONS

Lehmann, Thomas; "Commissary Methods of Processing Pizza Dough", American Institute of Baking, vol. VIII, Issue 12, Dec., 1986.

"Application of DK–ESTER for Baked Goods", Dai–Ichi Kogyo Seiyaku Co., Ltd., Application Research Institute, pp. 1–8. No date.

"DK ESTER sucrose fatty acid ester", DKS International, Inc., Overseas Division of Dai–Ichi Kogyo Seiyaku Co., Ltd., pp. 1–13. No date.

*Primary Examiner*—Lien Tran
*Attorney, Agent, or Firm*—Patterson & Keough, P.A.

[57] ABSTRACT

A substantially shelf-stable refrigerated yeast-raised pizza dough product comprises high-protein-content flour, water, at least one polyvalent fatty acid ester, and active yeast. The quantity of polyvalent fatty acid ester in the dough product is chosen to increase the period of time in which the dough product can be held at refrigerated temperatures substantially without diminishing sensory, rheological or other functional characteristics. A method of making a pizza dough product, a method of making a pizza, a method of making a pizza dough product from a pizza dough pre-mix, a plurality of dough balls, a pizza dough pre-mix, and a pizza itself provide similar advantages.

30 Claims, 1 Drawing Sheet

U.S. PATENT DOCUMENTS

| | | |
|---|---|---|
| 5,440,027 | 8/1995 | Hasenhuettl . |
| 5,453,498 | 9/1995 | Nakamura et al. . |
| 5,458,903 | 10/1995 | Colson et al. . |
| 5,458,910 | 10/1995 | Gruetzmacher et al. . |
| 5,464,643 | 11/1995 | Lodge . |
| 5,490,995 | 2/1996 | Corrigan . |
| 5,514,404 | 5/1996 | Zimmerman et al. . |
| 5,514,405 | 5/1996 | Yokomichi et al. . |
| 5,595,773 | 1/1997 | Wada et al. .............................. 426/20 |

IN STORE MANUFACTURING OPTION

OFF-PREMISE MANUFACTURING OPTION

REFRIGERATED YEAST-RAISED PIZZA DOUGH

CROSS-REFERENCE TO RELATED APPLICATION

This application is related to U.S. Provisional Application No. 60/017,809, filed May 14, 1996, which is incorporated herein by reference and priority to which is claimed under 35 U.S.C. § 119(e).

BACKGROUND OF THE INVENTION

1. Field of the Invention

The present invention relates to dough products, and more particularly, to edible, refrigerated, yeast-raised pizza dough products for which an extended shelf life in the refrigerated state is desired.

2. Description of Related Art

Polyvalent alcohol fatty acid esters, such as sucrose fatty acid esters, also called "Sucrose Ester", have been known for many years. A process for making certain of these esters was described by Hass et al. (U.S. Pat. No. 2,893,990). Another process for making certain of these esters was described by Osipow et al. (U.S. Pat. No. 3,480,616). Goto et al. (U.S. Pat. No. 3,928,212) reported the use of certain of these esters as an agent for softening fabrics having excellent moisture absorbability. As noted in this disclosure, an object of this invention was to provide a harmless softening agent prepared by using a material useful as a food additive.

At least some of the polyvalent alcohol fatty acid esters of the present application have been approved for use in foods and are used as emulsifiers, surfactants or surface active agents in foods. These agents have been used in coffee-whitener, whipped topping, ice cream, ice milk, candies, margarine and other fat spreads, drinks, powdered drinks, boiled fish paste, noodles, salad oil, breads, biscuits, chewing gum, meat paste, bean curd, flour paste, and frozen dough. In breads, certain of these esters are stated to "prevent" the deterioration of starch, extend the shelf-life of the finished bread product, enhance its "tenderness" and increase its volume. Certain of the esters are also stated to "prevent" a change in the quality of the bread during freezing. In flour paste, it is stated that it is believed that certain of the esters prevent water-separation and extended shelf life. None of these products are yeast-raised refrigerated dough products, however and none are pizza-type products. Previous uses of esters have been in physical and chemical environments significantly different than a pizza-type product environment.

In yeast-raised refrigerated dough products, the yeast generally starts metabolizing when water is added to the dry matter, and continues to metabolize during refrigeration. The dough matrix is a matrix or system like none of the other food systems discussed above, because of presence of active yeast which is believed to actively metabolize sugars and carbohydrates within the dough matrix during refrigeration, and produce glutathione, which breaks down the protein structure. In the past, it has been particularly difficult to develop a suitable yeast-raised dough, suitable for pizza dough, which will retain its desirable characteristics for even a relatively short period of time, if it is refrigerated. It will be appreciated, therefore, that further improvements to yeast-raised dough products will make valuable contributions to the dough-making and culinary arts.

DK Esters are generally described in the documents entitled "Application of DK ESTER for Baked Goods", and "DK ESTER Sucrose Fatty Acid Ester", DKS International Inc., Overseas Division of Dai-Ichi Kogyo Seiyaku Co., Ltd. which documents are incorporated herein by reference in their entirety.

The use of esters, such as DK Esters, in various products is described in the forty-two U.S. patents listed in the Appendix of the above-identified provisional patent application. Each of the forty-two listed patents is incorporated herein by reference in its entirety.

SUMMARY OF THE INVENTION

The present invention provides a shelf-stable refrigerated yeast-raised pizza dough product including flour of high protein content, water, at least one polyvalent alcohol fatty acid ester, and active yeast. In preferred embodiments the polyvalent alcohol fatty acid ester will be a mixture of sucrose fatty acid esters ("sucrose esters"), and the dough will include sugar as a fuel source for the active yeast. It will be appreciated that oil, salt, non-fat dry milk (NFDM), flavorings and other suitable ingredients commonly present in pizza dough may be included in preferred embodiments. In more preferred embodiments, the sucrose ester will be one of a number of commercial products from Dai-ichi Kogyo Seiyaku Co., Ltd., called DK Esters which are approved for use in foods and are mixtures of sucrose esters, most preferably one such product called DK F-160.

In preferred embodiments, the polyvalent alcohol fatty acid ester will be included in an amount which is effective to accomplish any or all of the following: (1) improve the hydration of wheat protein within the wheat flour; (2) increase, improve and/or control the volume of the dough both prior to and after refrigeration; (3) improve upon the consistency of the dough development prior to refrigeration so as to provide for a more consistent development of the dough at the time of preparation for baking or during baking; (4) improve upon the evenness of hydration of the dry materials used to make the dough when the dry materials are mixed with water; (5) make the dough easier to (a) cut evenly, and (b) round or form; (6) reduce the degree to which the surface of the dough dries and the degree to which the surface of the dough is subject to the formation of a "tough" skin over time during refrigerated storage; (7) improve the compressibility and/or control the shape of the refrigerated dough for purposes of dough handling; (8) improve the extensibility of the refrigerated dough; (9) improve the tensile strength of the refrigerated dough; and (10) improve the elasticity of the refrigerated dough.

In the most preferred embodiments, the polyvalent alcohol fatty acid ester will be approved for use in foods and will be added to the mixture of ingredients in an amount which is effective to extend or increase the period of time in which the resulting dough can be held at a refrigerated temperature in the range of about 38–42° F. substantially without diminishing Theological characteristics such as compressibility, extensibility, tensile strength, elasticity and the like of the refrigerated yeast-raised dough more than about 20%, preferably about 10%, more preferably about 5% during refrigeration for a period of about 24 hours, preferably about 48 hours, and substantially without diminishing sensory or other functional characteristics as well. Preferably the preferred ester will be a DK Ester called DK F-160 and it will be included in an amount ranging from about 0.05 to about 0.2 percent by weight of the finished dough product. Surprisingly, this small amount DK F-160 provides for a desirable increase in the time in which desirable characteristics of the dough are retained when refrigerated. As concentrations decrease, the efficacy of the refrigerated dough for its commercial use becomes less and less viable, and as the concentration is increased the dough becomes more and more susceptible to the incorporation of potential off-flavors due to the inclusion of these higher concentrations of esters. Within this range, however, an acceptable dough can be produced which provides a shelf-stable dough during refrigeration at 40° F. for a period of up to at least 72 hours. To the extent sufficient methods of masking these potentially offensive off-flavors are used, higher concentrations of these esters may be useful.

It is an object of the present invention to provide a refrigerated yeast-raised pizza dough product which has an extended period of time during which it will retain favorable or desirable characteristics during refrigeration that are projected to result in a finished pizza product which has characteristics associated with greater commercial acceptability. It will be appreciated that it would be desirable to provide refrigerated yeast-raised pizza dough which has an extended or increased "shelf life" during refrigeration when the yeast activity is diminished but not slowed to the minimum level of metabolism expected during frozen storage, so that commercial pizza restaurants may provide more consistent baked pizza products made in bulk processes, and made in manufacturing facilities removed from the facility in which the finished product is baked and/or provided to the consumer.

In alternate embodiments, the present invention provides a pizza dough pre-mix including wheat flour, polyvalent alcohol fatty acid ester, and activated dry yeast. The pre-mix preferably includes any of the following as well: sugar, molasses, oil, salt, NFDM, flavorings and mixtures thereof. In a method of making refrigerated yeast-raised pizza dough of the present invention, a preferred pre-mix of the present invention is mixed with cool water, preferably at from about 33 to about 38° F., more preferably at from about 34 to about 36° F. Then when mixing is complete, the temperature of the dough is reduced from the finished dough temperature to from about 36 to about 46° F., preferably from about 38° F. to about 42° F. In preferred embodiments, the finished dough temperature is from about 58° F. to about 70° F., preferably from about 62 to about 68° F., more preferably from about 64 to about 66° F.

In preferred methods of making the refrigerated yeast-raised dough of the present invention, the dough is cut, rounded and coated with oil, preferably olive oil, prior to chilling to the refrigerated storage temperature. The present invention also provides for yeast-raised pizza dough balls made of a preferred pizza dough product of the present invention and coated with a preferred oil, preferably olive oil.

In further embodiments of the present invention, a process of making a pizza is provided which includes the step of making a refrigerated yeast-raised dough of the present invention, storing it at a refrigerated storage temperature for from about one to about seven days, preferably from one to about three days, using the refrigerated dough to make an unbaked pizza, and baking the unbaked pizza to make a finished product. The present invention also includes a pizza product made by preferred methods of the present invention and a pizza product including a preferred refrigerated yeast-raised pizza dough.

In further embodiments of the present invention, a plurality of refrigerated dough balls of the present invention are provided, wherein the plurality of dough balls are alternatively made by preferred processes of the present invention or include the refrigerated yeast-raised dough of the present invention. In a further embodiment of the present invention, a plurality of unbaked pizza products or, alternatively, a plurality of baked pizza products are provided. In each case the plurality of products are made by preferred processes of the present invention wherein each of at least two respective dough balls of the present invention are used to make at least first and second iterations of the respective products and the method of making the respective first and second iterations of each of the respective products includes the step of making the second iteration at least about 24 hours after making the first iteration, wherein the first and second iterations are made from dough balls made in the same "batch".

BRIEF DESCRIPTION OF THE DRAWINGS

Several aspects of the invention will be described with respect to the figures, in which.

DETAILED DESCRIPTION OF PREFERRED EMBODIMENTS

Figure 1:
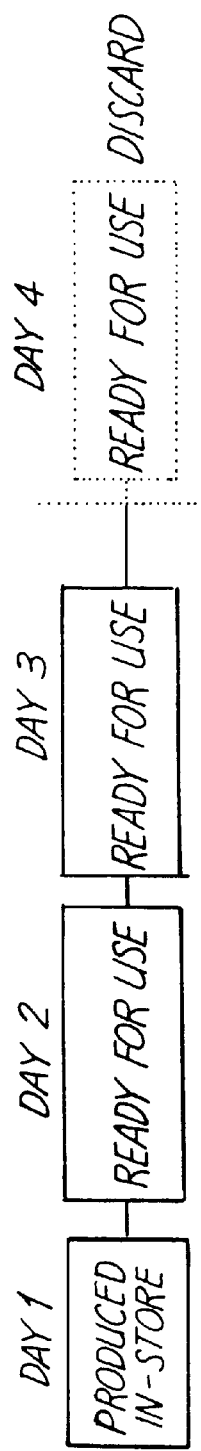
FIG. 1 is a flow diagram showing an in-store dough manufacturing option, according to an embodiment of the invention.

Embodiments of the present invention apply to edible yeast-raised dough products suitable for use in a number of different foods, for example, yeast-raised bread products like raised pita bread, french bread, italian bread, sourdough breads and the like. Although preferred embodiments of the invention will be described with respect to pizza-type products, the invention is not necessarily limited to such products.

Embodiments according to the present invention afford a number of advantages over prior art yeast-raised dough products. Dough products according to the present invention have a significantly increased period of time (or shelf life) in which these products retain desirable characteristics which are present in the dough after the dough is developed and refrigerated for up to 7 days. The present refrigerated yeast-raised dough products are made by mixing a dry mix including wheat flour, active yeast, and a polyvalent alcohol fatty acid ester (fatty acid ester), and water. In preferred embodiments, the water is cooled and the dry mix can include any of the following: a source of sugar or of further carbohydrate material, salt, oil, flavorings, NFDM, other commonly used dough-making ingredients or the like. In preferred embodiments, the polyvalent alcohol fatty acid ester is a sucrose fatty acid ester or sucrose ester.

The desirable characteristics that the dough preferably may have after it is developed include the following: (1) uniform development; (2) uniformly hydrated wheat gluten proteins; (3) even hydration, allowing more even and uniform cutting and better rounding; (4) greater softness and tenderness, providing a dough that is easier to handle; (5) softness and superior compressibility; (6) superior extensibility; (7) superior tensile strength; and (8) superior elasticity. In the refrigerated yeast-raised dough of the present invention, these characteristics can be retained for a longer period of time than is expected in refrigerated yeast-raised dough products that do not include polyvalent alcohol fatty acid esters (standard dough).

Furthermore, other characteristics exhibited in baked pizza made with the preferred dough, such as the following, are more likely to be retained in products made from the refrigerated yeast-raised dough products of the present invention as compared to those made from standard dough: (1) evenness of browning; (2) light crispness of the baked crust; (3) uniformity of the "cells" or open spaces in the baked pizza dough; (4) pleasant chewy consistency of the pizza crust; (5) increased "softness" or "tenderness" of the baked crust; and (6) increased dough volume and/or oven spring of baked product. The inclusion of the fatty acid ester also acts to diminish the likelihood of any noticeable starch retrogradation. It is surprising that the refrigerated yeast-raised pizza dough of the present invention can retain these attributes for a longer period of time than might otherwise be possible during refrigeration of the yeast-containing dough matrix of the present invention. Furthermore, it is especially surprising that such a small amount of fatty acid ester or the preferred sucrose ester, as will be further discussed below, will have such a significant effect on preserving the aforementioned attributes and characteristics.

In addition to the fatty ester, preferred embodiments of dough products according to the invention also include the following ingredients: spring wheat flour, water, sugar, preferably fine granulated sugar, salt, preferably fine-blending salt, oil, preferably vegetable oil, hydrogenated shortening, activated yeast, preferably PADY yeast, a dairy-type product, and flavoring agents, preferably spray-dried encapsulated flavoring agents. Preferred ingredient proportions are listed in the attached Examples I and II. Example I is a dough pre-mix, and Example II is a completed dough product created by adding water to the preferred pre-mix.

Preferred aspects of the ingredients will now be described in more detail. It should be recognized that one of ordinary skill in the art will be able to make certain substitutions, source changes, proportion variances and other modifications as needed to achieve a particular end product, without departing from the spirit and scope of the invention.

Flour

Preferred embodiments according to the invention use a high-protein flour, having a protein content ranging from about 10.5 to about 14 % by weight, preferably about 11.5% to about 13% by weight. High-protein flours are preferred because they provide the dough product with greater protein structure and/or quantity. It has been found that increased protein structure and/or quantity binds up water better within the dough product, maintaining and holding moisture within the product to yield longer shelf life. Additionally, enhanced protein characteristics provide better elasticity and expandability, which aid in holding gases generated due to yeast action and thus promote the raising of the dough.

To achieve the preferred protein content range, spring wheat is preferred over winter wheat. Spring wheat generally has a high protein content compared to e.g. winter wheat. Although winter wheat can be used, its generally lower protein content reduces shelf life of the final dough and thus results in a non-optimal final product. Of course, a spring wheat/winter wheat blend can be used to achieve the desired protein range. For example, if a certain year's spring wheat crop has a 13% protein content but 13% is too strong for a particular dough product, a hard, red winter wheat can be blended into the spring wheat to reduce the protein content slightly.

No other grain has as advantageous a protein structure as wheat grain, according to preferred embodiments of the invention. Therefore, wheat flour, as opposed to e.g. a potato flour or other no-protein or low-protein flour, is preferred. A number of experimental doughs were examined that used potato flour, starches, gums, or other ingredients, instead of or in addition to wheat flour, in an attempt to provide sufficient protein structure. However, wheat flour, and in particular, spring wheat flour, has been found to be the most desirable. Such wheat flour is readily available on the open market, for example from Con Agra. Further, although there may be other flours that perform adequately, such as oat or barley flours, these are not necessarily traditional for use in a pizza dough ball.

Fatty Acid Ester

As mentioned previously, refrigerated dough products according to the invention incorporate a polyvalent alcohol fatty acid ester (fatty acid ester) which is approved for use in foods. A preferred fatty acid ester used is a mixture of sucrose fatty acid esters sold as DK Esters by Dai-ichi Kogyo Seiyaku Co., Ltd., of Japan, and distributed by Montello, Inc. of Tulsa, Okla. and Lipscomb Chemical Co., Inc., of Long Beach, Calif.

Fatty acid esters useful in the present invention are polyvalent alcohol fatty esters at least presently approved for use in foods. These fatty acid esters can include esters selected from the group consisting of sugar fatty acid esters, sorbitan fatty acid esters, glycerin fatty acid esters, propylene fatty acid esters and the like. Preferably, the esters are a mixture of esters including at least about 10 percent by weight of monoester on the basis of the total weight of the esters. These esters are also described in U.S. Pat. Nos. 3,928,212; 3,480,616 and 2,893,990, each of which is hereby incorporated by reference. The above-identified provisional application lists additional U.S. Patents, each of which references at least one of the aforementioned patents. Each of the U.S. patents listed in the provisional application is hereby incorporated by reference. The above-referenced brochure entitled "DK ESTER Sucrose Fatty Acid Esters", describing preferred sugar fatty acid esters usable in preferred embodiments of the present invention, is also hereby incorporated herein by reference. One type of DK Ester, DK F-160, has a particularly advantageous boosting effect on the protein in the dough, yielding a particularly long shelf life. Of course, other types of DK Esters, either presently available or available in the future, may have similar effects.

Typical refrigerated yeast-raised pizza doughs suffer a significant disadvantage in that by Day 3 and Day 4 after preparation, the protein structure of the dough has at least partially collapsed and/or deteriorated. Consequently, the dough has begun to form strands and become stringy, so that a spider-web appearance is noted inside the dough. This breakdown in protein structure is caused by activated yeast, which first feeds on the sugars in the dough, then breaks down the starches into simple sugars and feeds upon them, and then produces glutathione, which breaks down the protein structure. Eventually, the protein structure deteriorates, causing the web-like appearance and sharply reducing the dough's refrigerated shelf life.

The present inventors have discovered, however, that adding a fatty acid ester such as DK F-160 builds up the dough product's protein structure, yielding a consistent protein matrix many days after production and subsequent refrigeration. The product's refrigerated shelf life thus is significantly increased. The protein structure is also more uniform throughout the entire mass of dough, achieving consistency throughout the mass without excessive thin or thick spots and without significant webbing. "Slapping-out" the dough ball is also easier and the resulting dough base is more uniform, and more consistent from dough ball to dough ball.

The F-160 type of DK Ester is preferred because of its high hydrophilic properties. DK F-160 is a mixture of sucrose fatty acid esters including about 70% mono esters and about 30% di-, tri- and other polyester molecules. The esterified fatty acids in DK F-160 roughly include about 70% stearate and 30% palmitate. In preferred embodiments, the fatty acid ester, preferably the sucrose fatty acid ester, more preferably the DK Ester, and most preferably DK F-160, is added to the dough in amounts in a range of from about 0.025 to about 0.25, preferably from about 0.05 to about 0.2, more preferably about 0.06 to about 0.175, even more preferably about 0.07 to about 0.15, even more preferably about 0.075 to about 0.125, even more preferably about 0.09 to about 0.11, and most preferably about 0.1 percent by weight of the mixed dough.

DK Ester is a non-ionic surface-active agent manufactured from a pure sugar and a hydrogenated tallow. Chemically speaking, it is an ester compound including sucrose and fatty acids. Its chemical structure, where R is an alkyl group, is as follows:

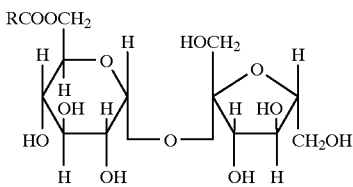

The monoester is a type of sucrose ester that has one molecule of fatty acid combined with one molecule of sucrose. The diester is two molecules of fatty acid and the triester is three molecules of fatty acid. The more monoester contained in sucrose ester, the higher hydrophilic property it shows. The more diester, triester, and polyester, the higher the lipophilic property. DK Esters are purified grade sucrose fatty acid esters that are effective in various applications. Various grades exist, from high hydrophilic properties to high lipophilic properties.

It is believed that the added DK Ester binds with the protein matrix uniformly throughout the dough product, evenly hydrating the protein matrix and promoting consistent dough development throughout the entire mass. Because the protein matrix is hydrated before other elements of the dough, better protein stability and longer shelf life are achieved.

Protein development through e.g. mixing, kneading and/or folding the dough is enhanced by the added DK Ester. Mixing, kneading and/or folding the dough actually develops the protein matrix. Without sufficient matrix development, i.e. without sufficient mixing, kneading and/or folding, the dough's protein structure will not be established enough to hold the gases developed as the yeast ferments the sugars. Inadequate rise and/or oven spring thus will occur. On the other hand, if too much mixing, kneading and/or folding occurs, the protein structure will begin to break down. (The optimal amount of mixing, kneading and/or folding for any given dough will be empirically determinable by those of ordinary skill in the art.) The DK Ester promotes optimal protein structure, yielding a somewhat elastic dough that has sufficient spring and pull. As the dough rises, the developed protein matrix holds the gases in the cells because the dough has sufficient elasticity to expand.

Additionally, the DK Ester promotes even hydration of the proteins throughout the entire dough mass, promoting even and consistent protein matrix development. Thus, embodiments of the invention enjoy a more consistent mix through the entire mass of dough.

Adding the correct amount of DK Ester to the dough mix is very important. Too much DK Ester causes the protein structure to break down prematurely, thus decreasing shelf life. Dough flavor is also adversely affected. On the other hand, too little DK Ester results in inadequate protein matrix development, yielding webbiness, thin spots, inconsistency and other adverse structural characteristics as the dough ages. The embodiment of Example I includes 0.15% by weight of DK F-160 in the pre-mix. A preferred range of DK Ester in the dry pre-mix is from about 0.05 to about 0.4, preferably 0.075 to about 0.3, more preferably about 0.1 to about 0.2, and most preferably about 0.15 percent by weight of the dry pre-mix.

A number of DK Ester levels in various dough products, and corresponding empirically observed results, are shown in Examples III–XI.

Water

As described earlier, water is added to dough pre-mix to create useable dough or "wet" dough. The temperature of the freshly-mixed wet dough has important effects on its refrigerated shelf life, and thus the temperature of the water added to the pre-mix should fall within a preferred range.

The inventors have determined that for optimal refrigerated shelf life, a preferred temperature range of the dough coming out of the mixer is from about 60° F. to about 66° F., preferably about 64° F. to about 66° F. As the initial dough temperature of the mixed dough increases, an undesirably high level of early yeast activity may occur, reducing the refrigerated shelf life of the dough. This premature yeast activity causes premature breakdown of the dough's sugars, starches and then protein structure, decreasing shelf life. If initial dough temperature is below about 62° F., on the other hand, lower yeast activity takes place shortly after the dough is prepared, impeding proper dough development and appropriate mellowing of the entire protein structure so that the dough will lack appropriate flavor and structural characteristics after only 24 hours of refrigeration, thus providing highly undesirable "green" dough after 24 hours. In the preferred range of from about 64° F. to about 66°F., ideal conditions are presented to provide a surprisingly long refrigerated shelf life.

It is often desired to use the prepared dough after 24 hours on the first day after manufacture, which for purposes of discussion will be called "Day 2" (Day 1 being the day of manufacture). If the freshly mixed dough is too cold, the Day 2 dough will be very "green." It will have insufficient oven spring, i.e. insufficient dough rise, yielding a very flat, dense dough out of the oven. Actual cell structure within the dough will be unacceptably dense, i.e. very small and fine, causing a very tough chew instead of a more desirable light fluffy texture. An irregular and larger cell structure, which is more desirable, will not be achieved on Day 2. Additionally, splotchy and undesirably light coloring will occur, instead of a more-pleasing golden brown coloring. This results from uneven yeast activity, which causes uneven sugar metabolization and thus uneven browning. The flavor is also unbalanced, resulting in a bland taste. Thus, too low an initial dough temperature pushes back the starting point of possible dough use past Day 2.

Because the temperature of the freshly mixed dough is directly related to the temperature of the water added to the pre-mix, and/or the pre-mix itself, accurate initial water temperature is very important. A preferred water temperature range is about 34° F. to about 36° F. It has been determined that a water temperature of greater than approximately 36° F. can yield an initial dough temperature of higher than 66° F., causing undesirably high front-end yeast activity. Water temperature below about 34° F. results in dough that is not useable at Day 2, as described above, and also potentially causes equipment freeze-up problems as water temperature nears 32° F. Room-temperature pre-mix is also preferred, according to embodiments of the invention.

Initial water/dough temperatures thus significantly affect the days on which the dough product will be usable. Warmer temperatures promote early yeast activity, allowing earlier dough use, but may shorten usable life by up to several days. If the dough product is being produced, stored and consumed/sold at a single location, such as a single pizza restaurant with limited refrigerated storage space, such warmer temperatures may be desirable. Colder temperatures delay yeast activity, extending the "window" of available dough use and potentially allowing use at least six days after manufacture, but preventing use the day after manufacture. With colder initial temperatures, dough for multiple remote sites can be prepared at a central location, promoting product consistency, and then shipped.

The end of usable refrigerated shelf life is marked by the previously mentioned adverse structural characteristics, for example, webbiness. Additionally, the dough's flavor profile becomes unbalanced. Fermentation occurs, resulting in an alcohol-type, almost "beery" flavor that does not mesh well with the overall flavor system of the product. The slapped-out dough would also lack oven spring, as well as desired texture. At this point, of course, the dough must be discarded.

It has been determined that tap water from many municipal water systems is suitable for dough products according to the present invention. Although deionized or filtered water can be used, they are not believed to be necessary unless the local water has unusual or unanticipated characteristics. Such deficiencies will usually be determined empirically.

Sugar

A fine granulated sugar is preferred for use with embodiments of the invention, primarily because doughs according to the invention can be created from a dough pre-mix. Fine granulated sugars promote better mixing and consistency within the pre-mix. Larger grinds, on the other hand, can cause stratification during shipping, packing or hermetic conveying in the manufacturing facility. Fine granulated sugar, which is not as fine as powdered sugar but not as coarse as table sugar, is readily commercially available, as for example from the Domino Sugar Company.

The sugar within the dough acts as a tenderizing agent, promotes desirable flavor, aids with proper browning, and provides a ready "food" supply for the active dry yeast to feed on before feeding on the starches and protein structure. Increased sugar content thus delays breakdown of the protein structure, increasing refrigerated shelf life, although of course too much sugar can also have detrimental effect in terms of yeast growth, texture and flavor.

Salt

A fine-blending salt is preferred to promote better mixing, for the same reasons that fine sugar is preferred. Salt is important for proper flavoring, its hydrophilic properties are believed to help to control moisture content within the dough, and it also aids in controlling yeast activity. Fine-blending salt is readily available on the market, as for example from Cargill, Incorporated.

Vegetable Oil

Any oil can be used, according to embodiments of the invention, but vegetable oil is preferred due to concerns about potential off flavors. Vegetable oil lubricates the product to enhance its workability, and it promotes product tenderness. Soybean and/or cottonseed oils are preferred, although other oils, such as olive oil, are also possible. Certain oils, however, including sunflower and corn oils, potentially adversely affect the overall flavor profile of the dough.

Hydrogenated Shortening

A hydrogenated shortening is preferably used to provide a slight crispiness to the outside of the cooked dough. The hydrogenated shortening provides better crust definition and crispiness. Hydrogenated shortening suitable for use with the invention is readily available on the market, as for example the SHO-2 product from Central Soya.

Yeast

Activated yeast is an essential ingredient in the present dough. A protected active dry yeast (PADY yeast) preferably is used, according to embodiments of the invention. Yeast in a protected active dry state includes a protective barrier that prevents moisture from immediately being drawn within the yeast cells and starting yeast activation. PADY yeast thus keeps stray moisture away from the yeast cells in the dough pre-mix according to the invention, preventing activation until water is added.

PADY yeast also yields a better flavor profile, coloring, and heat-resistance over e.g. compressed yeast or cream yeast. It also takes longer to dissolve and longer to activate, so that better control and longer shelf life can be achieved. Of course, plain active dry yeast can be used, particularly in a non-pre-mix environment, i.e. where water is being added right away. The amount of such yeast can be chosen to correspond to a desired flavor profile. Yeast amount also affects useable life of the dough. Protected active dry yeasts are readily available on the market, as for example from Red Star.

Dairy-Type Product

A preferred dairy-type product for use with embodiments of the invention is sold under the trade name Super Heat Dairy Blend, from Land O'Lakes. This non-fat dry-milk product balances out the overall flavor profile, provides a dairy flavor, aids in browning and aids in proper pH of the system. The Super Heat Dairy Blend used according to the invention is a mixture of dry whey, non-fat dry milk, and dry buttermilk. Of course, other commonly available dairy ingredient blends also can be used to achieve a desired flavor profile and other characteristics.

Flavoring

To achieve a desired flavor profile, a spray-dried encapsulated flavoring agent preferably is added to the dough. Level and type of flavoring may directly affect dough rheology and yeast activity, and thus may need to be compensated for, and further study/consideration of this point is contemplated. Many different flavors can be used to achieve a desired effect, for example, yeast flavors. Spray-dried encapsulated flavorings are readily available on the market.

Creation of Pre-Mix

Preferably, flour is deposited in a mixing apparatus first and tumbled together with the other, subsequently added dry ingredients. A wide variety of mixers can be used, for example a Hobart 60-quart mixer. All of the dry ingredients are preferably mixed for about three to about four minutes, according to one embodiment. The hydrogenated shortening is preferably added and broken up throughout the rest of the dry mix, following which the vegetable oil is added and mixed for about another five minutes, until complete homogenization occurs. The resulting dry mix is very loose and pourable but not thoroughly dry. Of course, the ingredients can be combined and mixed in other orders to suit a particular product, mixing apparatus, etc.

The pre-mix preferably is stored at from about 38° F. to about 80° F., most preferably in a cool, dry place. Excessive moisture and/or excessive heat will degrade the yeast and potentially render the pre-mix unusable. Exposure to heat for long periods of time will start yeast activation and prematurely break down the protein of the pre-mix, and ultimately kill the yeast. Under proper storage conditions, preferably at temperatures of between about 38° F. to about 60° F., the pre-mix has a shelf life of about 8 weeks. The pre-mix can be stored in a bag having a moisture-resistant and/or grease-resistant coating to ensure proper isolation from outside elements, such as a "Kraft" bag with an FC807 coating, for example, for particular applications.

Creation and Storage of Workable Dough

Figure 2:
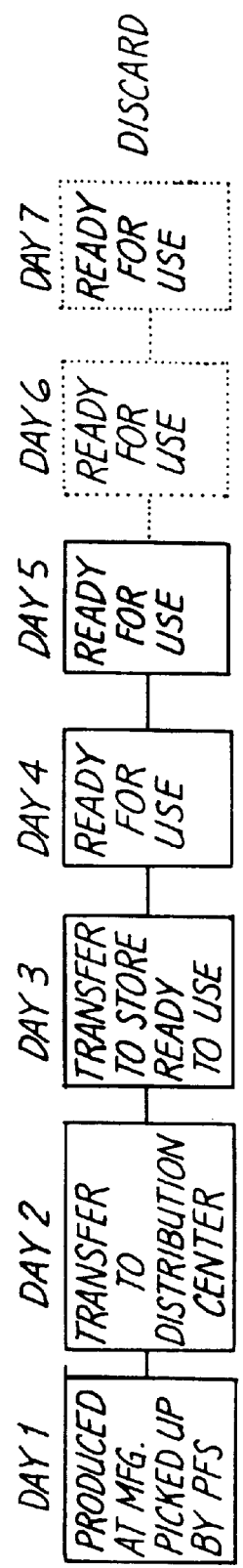
FIG. 2 is a flow diagram showing an off-premise dough manufacturing option, according to an embodiment of the invention.

A number of manufacturing options have been considered. Two of these are shown in FIGS. 1–2. An off-premise option involves preparation of the dough and refrigeration at one site on Day 1, subsequent refrigerated transfer to a distribution center, preferably on Day 2, followed by transfer to a retail outlet where the refrigerated dough can be used or further refrigerated for later use on Days 3, 4, 5, 6, or 7. An in-store option involves production and refrigeration in the store on Day 1 and use on Day 2, 3, or 4, after which unused dough is discarded. The in-store option may become difficult operationally at high volumes, and so the off-premise may be preferred in some cases. Shelf-life issues, therefore, rise in importance.

When it is desired to produce a workable dough from the pre-mix, the water is added. The pre-mix and water are mixed together in a mixing bowl, preferably with a dough hook, preferably at a slow speed, for about nine minutes, according to a preferred embodiment. Attached Examples XII–XVI describe a number of different mixing speeds and times. Example XV is preferred, but of course the mixing parameters of any of these examples can be used, as can other mixing parameters as desired to suit a particular product/environment.

Once mixing is complete, the mixed product preferably is pulled out of the bowl and placed on a board that preferably has been sprayed lightly with olive or similar oil or spray to prevent sticking. The dough is then divided into portions according to the amount of dough necessary for a final product. For example, 12-ounce dough portions can be used for small pizza-type products, 22-ounce portions for large pizza-type products, and 27-ounce portions for extra-large products.

These dough pieces are individually deposited into a dough rounder to create dough balls. Completed dough balls are taken from the rounder and placed into a dough cambro, which preferably is a three-inch-high plastic-type box that prevents outside air from reaching the dough. Of course, usable cambros can have a variety of dimensions, materials and air-tightness factors.

The cambros are lightly sprayed with oil before dough balls are inserted, to prevent sticking. Each dough ball comes out of the rounder in a tear-drop shape, with a rough edge. The dough ball is preferably placed in the cambro rough-edge-down, and then the dough ball is pushed down so that it does not extend above the top of the cambro. The bottom of the cambro is coated with enough oil to completely coat the bottom, rough edge of the dough ball upon contact.

The whole dough ball then is preferably sprayed lightly with oil. Coating the entire dough ball with oil potentially prevents undesired product texture, e.g. potentially prevents the dough from drying out as easily and forming a "tough skin", or becoming undesirably crusty, which can cause tearing and holes as the dough is "slapped out". Further, according to one embodiment, the oil picks up any dry powdered product in which the dough balls are ultimately rolled, such as semolina. Semolina, a wheat byproduct that resembles yellow cornmeal, provides a homemade appearance and slightly increased crunchiness on the bottom of the baked dough product. Dry, non-oiled dough balls fail to adequately pick up the semolina.

According to preferred embodiments, olive oil is used to coat the dough balls. Other oils, such as soybean oil, cottonseed oil or corn oil can result in undesirable flavor changes due in part to problems with rancidity. Olive oil, on the other hand, develops more of an olive-like flavor as it ages, lending a more traditional taste to the finished dough product. According to one embodiment, the olive oil is sprayed on the dough balls from an aerosol spray can. Just enough olive oil is sprayed over the dough ball so that no dry spots exist.

It is preferred that the olive oil be 100% virgin olive oil, without any lecithin added. Adding lecithin or other ingredients can diminish spraying quality by causing undesirable globules. Additionally, added ingredients change the color of the oil and thus can adversely affect the color of the finished product. Of course, other oils can be used, depending on the desired flavor profile of the ultimate product, for example.

According to a preferred embodiment, the dough balls are placed in the cambros in specific patterns. Depending on the size of dough ball, eleven balls can be placed in the cambro, 4 in one row, 3 in a second row, and 4 in a third row. Larger dough balls can be placed in a 3-2-3 pattern, and still larger dough balls can be placed in a 3-3 pattern.

The cambros are then refrigerated at a preferred temperature of from about 35–37° F. According to one embodiment, a racking system can be used so that the cambros need not sit on top of each other, for example a so-called bakery rack that has air space underneath. Alternatively, the cambros initially are cross-stacked at 90° angles within the refrigeration unit and are not interlocked, to promote faster cooling. The dough cambros can be left cross-stacked until the dough balls reach a preferred temperature of from about 38° F. to about 40° F., which generally takes from about 1-½ to 2 hours, depending on dough ball size, precise refrigeration unit temperature, and/or initial dough temperature. After the dough balls reach this temperature, the cambros are "down" stacked up to seven cambros high. A lid is placed on the top cambro so that the dough balls therein are not exposed. It is believed that the more rapid the cool-down, the longer the shelf life. The rate of cool down may also affect the initial start date for the dough. The dough balls can be stored in this manner until the end of their refrigerated shelf life, for example until Day 4.

If the refrigeration temperature is lower than about 35–37° F., the dough will lie in a more dormant state and not be ready for use on Day 2, according to one embodiment. A longer period of initial refrigeration would be required before sufficient yeast activity occurred, but ultimate shelf life would be extended. At a refrigeration temperature above about 40° F., on the other hand, the yeast will activate more quickly, allowing use of the dough on e.g. Day 2 but causing undesirable off-flavors to develop more quickly, at some time after about Day 4. Thus, refrigeration temperatures, as well as initial water temperatures and initial dough temperatures as described above, can be manipulated to yield a desired refrigerated shelf life.

At the end of shelf life, "beery" off-flavors may be a phenomenon of cold fermentation. It has been contemplated that if dough balls are warmed prior to use into a range of about 50° F. to about 60° F., e.g. prior to making the pizza, the beery flavors may not be observed. Thus, it is possible that dough embodiments according to the invention can be held in that temperature range e.g. for between about 12 and about 15 hours at the end of a period of colder refrigeration, e.g. about four or five days, and still be usable although further consideration/study of this point is contemplated. Warming the dough may also contribute to eliminating any bubbling/blistering problems.

To achieve seven-day shelf-life, freshly manufactured dough in a temperature range of about 65 to about 67° F. can be put through e.g. a spiral refrigeration device, to rapidly cool down the pizza dough to a quiescent range of about 33° F. to 35° F. The pizza dough is then distributed, preferably while at this temperature range. When the dough is then stored at higher refrigeration temperatures for use, the remaining handling process, previously described in terms of numbers of days, begins. In other words, the seven-day shelf-life can be achieved according to one embodiment by rapid cool-down to a lower temperature, shipment in that lower-temperature stage, and then incorporation into a refrigerated-temperature system.

Creation of Final Edible Product

Upon removal from the refrigeration unit, the dough balls should be allowed to warm to a higher temperature before use. While the dough may be taken directly from the refrigeration unit, slapped out, topped and baked immediately, warmer dough has certain advantages. Dough that has been allowed to warm or "slack" to within a certain temperature range is easier to slap out, decreases the bake time, and improves the desired baking characteristics of the pizza.

The dough balls can be warmed in the cambros under ambient conditions or a controlled temperature environment.

The preferred temperature range of the dough for use under store operating conditions is about 50 to about 60° F. This range of temperature for the dough can be achieved by removal and storage at ambient for about 4–6 hours or at least about 12 hours in an about 55° F. controlled atmosphere environment.

Heat-distribution characteristics can be adjusted to avoid bubbling or blistering during the baking process. In some cases, for example, bubbling or blistering can be eliminated by resetting or reconfiguring the oven in such a way that heat is more evenly distributed from top to bottom, without causing excessive heat to be directed primarily to the bottom of the pizza. Additionally, lengthening baking time from e.g. about 5 minutes and 30 seconds to e.g. about 7 minutes, and correspondingly lowering oven temperature, also likely reduce bubbling and blistering. Lengthening the baking time, however, may not be desirable from an operations standpoint.

Additionally, docking of dough after hand-slapping can allow for gas release and can reduce bubbling and blistering, but can also affect end-product texture. Where possible, using sauce at an ambient rather than refrigerated temperature can also contribute to the reduction, because it causes a higher pizza starting temperature so that not as much heat is needed to bake the pizza to the desired end temperature.

Once a dough base is created by hand-slapping or other process, it can be topped to create a pizza-type product.

Attention is directed to the following Examples, and to the Laboratory Notes and other materials in the above-identified provisional patent application.

EXAMPLE I

| Example I | |
|---|---|
| Ingredient | True % |
| Flour, Spring Wheat | 87.26 |
| Sugar, Fine Granulated | 3.23 |
| Salt, Fine Blending | 1.97 |
| Soybean Oil | 1.73 |
| Super Heat Dairy Blend | 1.68 |
| Hydrogenated Shortening | 1.61 |
| Yeast Flavor | 1.48 |
| Yeast, PADY | 0.89 |
| DK Ester, F-160 | 0.15 |
| Total: | 100.00 |

EXAMPLE II

| Example II | | | |
|---|---|---|---|
| Ingredient | Grams | True % | Baker's % |
| Spring Wheat Flour | 3432.24 | 58.54 | 100 |
| Water, Cold | 1929.50 | 32.91 | 56.22 |
| Sugar, Fine Granulated | 127.12 | 2.17 | 3.7 |
| Salt, Fine Blending | 77.18 | 1.32 | 2.25 |
| Soybean Oil | 68.10 | 1.16 | 1.98 |
| Hydrogenated Shortening | 63.56 | 1.08 | 1.85 |
| Yeast, PADY | 35.00 | 0.6 | 1.02 |
| Super Heat Dairy Blend | 66.33 | 1.13 | 1.93 |
| DK Ester, F-160 | 5.85 | 0.1 | 0.17 |
| Flavor | 57.85 | 0.99 | 1.69 |
| Total: | | 100.00 | 170.81 |

| Ingredient | Example III (grams) | Example IV (grams) | Example V (grams) | Example VI (grams) | Example VII (grams) |
|---|---|---|---|---|---|
| Base Mix | 3768.2 | 3768.2 | 3768.2 | 3768.2 | 3768.2 |
| SH Dairy Blend | 66.33 | 66.33 | 66.33 | 66.33 | 66.33 |
| Yeast Flavor | 57.85 | 57.85 | 57.85 | 57.85 | 57.85 |
| Yeast, PADY | 35.00 | 35.00 | 35.00 | 35.00 | 35.00 |
| DK Ester, F-160 | 5.85 | 12.81 | 2.93 | 5.85 | 5.85 |
| Cold Water | 1929.5 | 1929.5 | 1929.5 | 1890.91 | 1659 |

Preparation Instructions

EXAMPLES III–VII

Use 32°–34° F. water

Mix dry ingredients together

Add water to mixing bowl

Add dry ingredients

Mix on low speed (using J-hook)
Mix on speed #2 for 4 minutes
Divide, round, and place in dough trays
Spray olive oil in tray and on doughball
Refrigerate
Observations

EXAMPLES III–VII

EXAMPLE III

Day 1: Underdeveloped, strands apparent, yeast not completely dissolved, slightly elastic Day 3: Slightly loose, but still defined. Hard to slap due to size, but easy to slap with respect to dough.

Day 5: Soft, easy to chew and break up. Cell structure very open/coarse with thick cell walls. Very irregular. Easy to handle. Flavor on target.

Day 7: Very similar to Example VI. Difference in slappability. More loose, less cohesive, more elastic throughout doughball, still separate though.

EXAMPLE IV
(DK Ester Amount Doubled Relative to III)

Day 1: Much more elastic, well developed, all cells apparent. Slightly past optimal. Granules of yeast very apparent.

Day 3: Excellent definition of doughball, very similar to Example V. Firm yet soft. Flecking scarce to none. Most elastic of the group, easy to slap.

Day 5: Cell walls not well defined. Very compact and thick. Cells that are defined are more like tunnels, less like fine bread crumb. Chew is very dense/doughy, balls up quickly. Flavor profile off. Hits quickly up-front with glue-like notes.

Day 7: Air bubbles apparent on surface. Scarce speckling. Definition still apparent but doughballs have interlocked in cambro. Webby interior but very thick strands, large holes in-between. Marginal for slapping. Good strength, but still deteriorated.

EXAMPLE V
(DK Ester Amount Halved)

Day 1: More development than without DK but significantly underdeveloped compared to Example III. Granules very apparent.

Day 3: Good doughball definition, raised, not flat, flecking minimal, firm yet soft, easy to slap.

Day 5: Cells elongated and laid open, coarse. Chew compresses quickly and is slightly doughy. Handling is no issue. Flavor—more glue—like end notes, lacks balance of control.

Day 7: Air bubbles on surface, brown flecks apparent but not excessive, doughball still defined. Interior: Webby with thick cell walls. Can't be slapped out.

EXAMPLE VI

Day 1: Dough handling—just under optimal development, dough acts dry, lacks elasticity.

Day 3: Doughballs still defined, integrity in edge. A few dark flecks, but scarce. Very firm. Takes some power to slap, but workable.

Day 5: Firm, slightly harder than others to slap, yet slappable. Flavor good. Cell structure very open/coarse with large cells. Also good chew.

Day 7: Good definition, still possesses raised looking edge. Flecks apparent. Minimal yeast still apparent on surface. Still slaps well. Outside slight stretchiness continuous. Middle—webby only next to skin. Granular, not all connected. Conclusion: Best.

EXAMPLE VII

Day 1: Too dry; could not get doughball to form under mixing parameters.

|  | Example VIII | Example IX |
| --- | --- | --- |
| Base Mix | 8.30 lbs | 8.30 lbs |
| Cold Water | 4 lbs, 4 oz. | 4 lbs, 4 oz. |
| PADY Yeast | 35 grams | 35 grams |
| SH Dairy Blend | 66.33 grams | 66.33 grams |
| DK Ester | 0 | 5.85 grams |
| Flavor | 57.85 grams | 57.85 grams |

Process
Mixed 1 minute on low, 4 minutes on speed #2
23 oz. doughballs individually panned, with olive oil in pan and over dough
Refrigerated
Observations
Day 1—Both products very easy to slap, good browning, oven spring. Example IX more cohesive than Example VIII. Example IX: good doughy, yeasty, bready flavor. Example VIII: not as flavorful.

|  | Example X | Example XI |
| --- | --- | --- |
| Base Mix | 8.43 lbs | 8.43 lbs |
| Cold Water | 4 lbs, 4 oz. | 4 lbs, 4 oz. |
| PADY Yeast | 23.14 grams | 23.14 grams |
| SH Dairy Blend | 66.33 grams | 66.33 grams |
| DK Ester | 0 | 11.70 grams |

Process
Cold water used to prepare both doughs. Floor time was held to less than 15 minutes. All dough balls held individually in pan-pizza pans coated with olive oil.
Observations
DK ester improved dough's rheology out of the mixer. Dough was more continuous and elastic in Example XI than in Example X.
Day 1: Baked at 415°
Example X: Pale white color; very little browning. Slightly crisp edge. Texture not as doughy/compressed. Flavor more yeasty/bready.
Example XI: Upfront flavor difference, almost glue-like. No lift in product, very pale, no crispness. Lacked color, volume. Flavor was foreign. Glue-like nature noted in top note.

EXAMPLE XII

Process:
Mix (2 bags)
6016 grams of 34–36 degree water (for two bags of mix)
Hobart 60 qt. (1) Hook
Mix for 1 minute on low speed
4 minutes on speed #2
Divide dough into 22 oz. doughballs
Spray the dough cambro and the doughballs with the olive oil spray
Prepare minimum of 2 cambros of dough. 8 doughballs per cambro in 3-2-3 pattern.
Refrigerate
1. Water temperature: 36°

2. Dough Temperature: 70°
3. Dough temperature prior to placing in the cooler: 70° (ball)
4. Time for the dough to come down to 40 degrees:

| Time in: | 9:19  |     |
|----------|-------|-----|
|          | 9:52  | 60° |
|          | 10:15 | 52° |
|          | 10:35 | 50° |
|          | 11:00 | 48° |
|          | 11:30 | 44° |
|          | 12:20 | 40° |

EXAMPLE XIII

Process
Mix (2 bags)
6016 grams of 34–36 degree water (for two bags of mix)
Hobart 60 qt. (S) spiral hook
Mix on speed #1 for 7 minutes
Divide dough into 22 oz. doughballs
Spray the dough cambro and the doughballs with the olive oil spray
Prepare minimum of 2 cambros of dough. 8 doughballs per cambro in 3-2-3 pattern.
Refrigerate
1. Water temperature: 36°
2. Dough Temperature: 62°
3. Dough temperature prior to placing in the cooler: 64° (bulk)
4. Time for the dough to come down to 40 degrees:

| Time in: | 9:52  |     |
|----------|-------|-----|
|          | 10:15 | 60° |
|          | 10:35 | 56° |
|          | 11:00 | 50° |
|          | 11:30 | 45° |
|          | 12:20 | 40° |

EXAMPLE XIV

Process
Mix (2 bags)
6016 grams of 34–36 degree water (for two bags of mix)
Hobart 60 qt. (S) spiral hook
Mix on speed #1 for 8 minutes
Divide dough into 22 oz. doughballs
Spray the dough cambro and the doughballs with the olive oil spray
Prepare minimum of 2 cambros of dough. 8 doughballs per cambro in 3-2-3 pattern.
Refrigerate
1. Water temperature: 32°
2. Dough Temperature: 62°
3. Dough temperature prior to placing in the cooler: 65° (bulk)
4. Time for the dough to come down to 40 degrees:

| Time in: | 10:15 |     |
|----------|-------|-----|
|          | 10:35 | 58° |
|          | 11:00 | 48° |
|          | 11:30 | 46° |
|          | 12:20 | 38° |

EXAMPLE XV

Process
Mix (2 bags)
6016 grams of 34–36 degree water (for two bags of mix)
Hobart 60 qt. (S) spiral hook
Mix on speed #1 for 9 minutes
Divide dough into 22 oz. doughballs
Spray the dough cambro and the doughballs with the olive oil spray
Prepare minimum of 2 cambros of dough. 8 doughballs per cambro in 3-2-3 pattern.
Refrigerate
1. Water temperature: 34°
2. Dough Temperature: 64°
3. Dough temperature prior to placing in the cooler: 66°
4. Time for the dough to come down to 40 degrees:

| Time in: | 10:35 |     |
|----------|-------|-----|
|          | 11:00 | 60° |
|          | 11:30 | 53° |
|          | 12:20 | 46° |

EXAMPLE XVI

Process
Mix (2 bags)
6016 grams of 34–36 degree water (for two bags of mix)
Hobart 60 qt. (S) spiral hook
Mix on speed #1 for 10 minutes
Divide dough into 22 oz. doughballs
Spray the dough cambro and the doughballs with the olive oil spray
Prepare minimum of 2 cambros of dough. 8 doughballs per cambro in 3-2-3 pattern.
Refrigerate
1. Water temperature: 36°
2. Dough Temperature: 65°
3. Dough temperature prior to placing in the cooler: 68°
4. Time for the dough to come down to 40 degrees:

| Time in: | 11:00 |     |
|----------|-------|-----|
|          | 11:30 | 60° |
|          | 12:20 | 46° |

While the invention has been described with reference to specific embodiments, the description is illustrative and is not to be construed as limiting the scope of the invention. Various modifications and changes will occur to those skilled in the art without departing from the spirit and scope of the invention.

What is claimed is:

1. A substantially shelf-stable refrigerated yeast-raised pizza dough product, comprising:
   flour;
   water;
   at least one polyvalent fatty acid ester; and
   active yeast;
   wherein the polyvalent fatty acid ester is included in the dough product in an amount ranging from about 0.06 to about 0.175 weight percent of the dough product; further wherein the dough product can be held up to at least 72 hours at refrigerated temperature.

2. The dough product of claim 1, wherein the at least one polyvalent fatty acid ester comprises sucrose and fatty acids.

3. The dough product of claim 1, wherein the at least one polyvalent fatty acid ester comprises a non-ionic surface-active agent manufactured from a sugar and a hydrogenated tallow.

4. The dough product of claim 1, wherein the at least one polyvalent fatty acid ester comprises the following chemical structure:

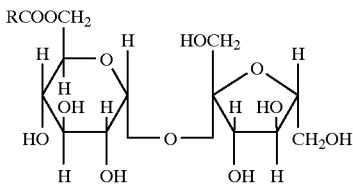

5. The dough product of claim 1, wherein the at least one polyvalent fatty acid ester includes an ester composition of about 70% monoester and about 30% diester, triester and polyester.

6. The dough product of claim 1, wherein the at least one polyvalent fatty acid ester includes a fatty acid composition of about 70% stearate and about 30% palmitate.

7. The dough product of claim 1, wherein the at least one polyvalent fatty acid ester is included in the dough product in an amount ranging from about 0.075 to about 0.125 weight percent of the dough product.

8. The dough product of claim 7, wherein the at least one polyvalent fatty acid ester is included in the dough product in an amount ranging from about 0.09 to about 0.11 weight percent of the dough product.

9. The dough product of claim 8, wherein the at least one polyvalent fatty acid ester is included in the dough product in an amount of about 0.10 weight percent of the dough product.

10. A method of making a substantially shelf-stable refrigerated yeast-raised pizza dough product, the method comprising:

providing flour;

providing active yeast;

providing at least one polyvalent fatty acid ester, wherein the polyvalent fatty acid ester is included in the dough product in an amount ranging from about 0.06 to about 0.175 weight percent of the dough product, further wherein the dough product can be held up to at least 72 hours at refrigerated temperature;

providing water;

combining the flour, yeast, at least one polyvalent fatty acid ester, and water to form a pizza dough product; and refrigerating the pizza dough product to form the refrigerated pizza dough product.

11. The method of claim 10, wherein the at least one polyvalent fatty acid ester is included in the dough product in an amount ranging from about 0.09 to about 0.11 weight percent of the dough product.

12. The method of claim 11, wherein the at least one polyvalent fatty acid ester is included in the dough product in an amount of about 0.10 weight percent of the dough product.

13. The method of claim 10, wherein the water has an initial temperature of about 34° F. to about 36° F.

14. The method of claim 10, further comprising the step of mixing the flour, yeast, at least one polyvalent fatty acid ester and water in a mixer, wherein the temperature of the dough product coming out of the mixer is between about 60° F. and about 66° F.

15. The method of claim 10, further comprising the steps of:

refrigerating the dough product for at least five days after manufacture; and using the dough product to form a pizza product.

16. The method of claim 10, further comprising the steps of:

forming at least one dough ball;

refrigerating the at least one dough ball;

warming the dough ball to a temperature of about 50° F. to about 60° F.; and holding the dough ball at a temperature of about 50° F. to about 60° F. for a period of up to about 12 to about 15 hours; and using the dough ball to form a pizza dough base.

17. The method of claim 10, further comprising the steps of:

providing sugar;

providing salt;

providing oil;

providing shortening; and combining the flour, yeast, at least one polyvalent fatty acid ester, water, sugar, salt, oil and shortening to form a pizza dough product.

18. The method of claim 10, wherein the step of providing water occurs at least about eight weeks after the flour, yeast, and at least one polyvalent fatty acid ester are combined.

19. A method of making a pizza using a substantially shelf-stable refrigerated dough product, the method comprising:

providing a substantially shelf-stable refrigerated dough product, the dough product formed from a combination comprising flour, water, at least one polyvalent fatty acid ester, and active yeast, wherein the polyvalent fatty acid ester is included in the dough product in an amount ranging from about 0.06 to about 0.175 weight percent of the dough product, the dough product having been held at a refrigerated temperature for a period up to at least 72 hours;

forming the dough product into a pizza dough base;

topping the pizza dough base; and baking the topped pizza dough base to form a pizza.

20. The method of claim 19, wherein the at least one polyvalent fatty acid ester is included in the dough product in an amount ranging from about 0.075 to about 0.125 weight percent of the dough product.

21. The method of claim 20, wherein the at least one polyvalent fatty acid ester is included in the dough product in an amount ranging from about 0.09 to about 0.11 weight percent of the dough product.

22. A method of making a substantially shelf-stable refrigerated pizza dough from a pizza dough pre-mix, the method comprising:

providing a pizza dough pre-mix comprising flour, at least one polyvalent fatty acid ester, and active yeast, wherein the polyvalent fatty acid ester is included in the dough pre-mix in an amount ranging from about 0.06 to about 0.175 weight percent of the pizza dough;

combining water with the pre-mix to make a pizza dough; and refrigerating the pizza dough, wherein the resulting refrigerated pizza dough is characterized by stability at refrigerated temperature for a period up to at least 72 hours.

23. The method of claim 22, wherein the at least one polyvalent fatty acid ester is included in the dough pre-mix in an amount ranging from about 0.075 to about 0.125 weight percent of the pizza dough.

24. The method of claim 23, wherein the at least one polyvalent fatty acid ester is included in the dough pre-mix in an amount ranging from about 0.09 to about 0.11 weight percent of the pizza dough.

25. A plurality of substantially shelf-stable refrigerated yeast-raised dough balls, the dough balls each comprising:

flour;

water;

at least one polyvalent fatty acid ester; and active yeast;

wherein the dough balls are characterized by stability when held at refrigerated temperature for a period up to at least 72 hours, further wherein the polyvalent fatty acid ester is included in the dough balls in an amount ranging from about 0.06 to about 0.175 weight percent of each dough ball.

26. The plurality of dough balls of claim 25, wherein the at least one polyvalent fatty acid ester is included in the dough balls in an amount ranging from about 0.075 to about 0.125 weight percent of each dough ball.

27. The plurality of dough balls of claim 26, wherein the at least one polyvalent fatty acid ester is included in the dough balls in an amount ranging from about 0.09 to about 0.11 weight percent of each dough ball.

28. A pre-mix for preparing a substantially shelf-stable refrigerated yeast-raised dough, comprising:

flour;

at least one polyvalent fatty acid ester; and active yeast;

wherein a refrigerated dough resulting from adding water to the pre-mix is characterized by stability when held at refrigerated temperature for a period up to at least 72 hours, further wherein the polyvalent fatty acid ester is included in the dough pre-mix in an amount ranging from about 0.06 to about 0.175 weight percent of the refrigerated dough.

29. The pre-mix of claim 28, wherein the at least one polyvalent fatty acid ester is included in the dough pre-mix in an amount ranging from about 0.075 to about 0.125 weight percent of the refrigerated dough.

30. The pre-mix of claim 29, wherein the at least one polyvalent fatty acid ester is included in the dough pre-mix in an amount ranging from about 0.09 to about 0.11 weight percent of the refrigerated dough.

* * * * *